United States Patent
Lan et al.

(10) Patent No.: US 11,044,230 B2
(45) Date of Patent: *Jun. 22, 2021

(54) DYNAMICALLY OPENING PORTS FOR TRUSTED APPLICATION PROCESSES HOSTED IN CONTAINERS

(71) Applicant: International Business Machines Corporation, Armonk, NY (US)

(72) Inventors: Ling Lan, Austin, TX (US); Hongxia Li, Markham (CA); Hai Long Liu, Beijing (CN); Xin Peng Liu, Tiantongyuan (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,883

(22) Filed: Aug. 30, 2019

(65) Prior Publication Data

US 2019/0386956 A1 Dec. 19, 2019

Related U.S. Application Data

(63) Continuation of application No. 15/853,404, filed on Dec. 22, 2017.

(51) Int. Cl.
*H04L 29/06* (2006.01)
*G06F 21/44* (2013.01)
(Continued)

(52) U.S. Cl.
CPC .......... *H04L 63/0236* (2013.01); *G06F 21/44* (2013.01); *G06F 21/53* (2013.01);
(Continued)

(58) Field of Classification Search
CPC . H04L 63/0236; H04L 63/0263; H04L 63/08; H04L 63/0807; H04L 63/10; G06F 21/44; G06F 21/53; G06F 21/6281
See application file for complete search history.

(56) References Cited

U.S. PATENT DOCUMENTS 5,828,833 A * 10/1998 Belville .................. G06F 9/547
726/11
8,245,285 B1 * 8/2012 Ravishankar ........... G06F 21/77
726/9
(Continued)

FOREIGN PATENT DOCUMENTS

WO 2017084276 A1 5/2017

OTHER PUBLICATIONS

K. S. Tso, M. J. Pajevski and B. Johnson, "Access Control of Web and Java Based Applications," 2011 IEEE 17th Pacific Rim International Symposium on Dependable Computing, Pasadena, CA, 2011, pp. 320-325. (Year: 2011).*

(Continued)

*Primary Examiner* — Robert B Leung
*Assistant Examiner* — Sameera Wickramasuriya
(74) *Attorney, Agent, or Firm* — Cuenot, Forsythe & Kim, LLCx

(57) ABSTRACT

A port listening request dynamically generated by an application process hosted in a container can be identified. Whether the application process hosted in the container is trusted can be determined. Responsive to determining that the application process hosted in the container is trusted, a first port to be used as an external port for the application process can be dynamically selected, and a port assignment can be communicated to a container engine, the port assignment indicating the first port is assigned to the application process. The first port can be mapped to a second port
(Continued)

assigned as an internal port for the application process. The first port can be opened for the application process.

7 Claims, 6 Drawing Sheets

(51) Int. Cl.
    *G06F 21/62* (2013.01)
    *G06F 21/53* (2013.01)

(52) U.S. Cl.
    CPC ...... *G06F 21/6281* (2013.01); *H04L 63/0263* (2013.01); *H04L 63/08* (2013.01); *H04L 63/0807* (2013.01); *H04L 63/10* (2013.01)

(56) References Cited

U.S. PATENT DOCUMENTS

| | | | | |
|---|---|---|---|---|
| 8,484,713 | B1* | 7/2013 | Ravishankar | G06F 21/77 726/9 |
| 9,100,390 | B1* | 8/2015 | Asnis | H04L 63/0823 |
| 2005/0111364 | A1* | 5/2005 | Hipp | G06F 9/50 370/230 |
| 2006/0259949 | A1* | 11/2006 | Schaefer | H04L 63/0428 726/1 |
| 2008/0178278 | A1* | 7/2008 | Grinstein | H04L 63/0227 726/12 |
| 2008/0222715 | A1* | 9/2008 | Bansal | H04L 63/0263 726/11 |
| 2008/0256618 | A1* | 10/2008 | Bansal | H04L 63/102 726/11 |
| 2012/0096271 | A1* | 4/2012 | Ramarathinam | H04L 63/0807 713/172 |
| 2012/0331461 | A1* | 12/2012 | Fries | H04L 67/2861 718/1 |
| 2014/0373109 | A1* | 12/2014 | McGrath | G06F 9/455 726/4 |
| 2015/0156183 | A1* | 6/2015 | Beyer | H04L 63/08 726/4 |
| 2016/0072816 | A1* | 3/2016 | Makhervaks | H04L 63/0245 |
| 2016/0285828 | A1* | 9/2016 | Keohane | H04L 63/0245 |
| 2017/0098071 | A1* | 4/2017 | Stopel | G06F 9/45545 |
| 2017/0250976 | A1* | 8/2017 | Ramachandran | G06F 9/45545 |
| 2018/0144123 | A1* | 5/2018 | Levin | G06F 21/53 |
| 2019/0020665 | A1* | 1/2019 | Surcouf | H04L 67/10 |
| 2019/0109820 | A1* | 4/2019 | Clark | H04L 47/19 |
| 2019/0199687 | A1 | 6/2019 | Lan et al. | |

OTHER PUBLICATIONS

"Link Via an Ambassador Container," [online] Docker Inc. © 2017 [retreived Dec. 22, 2017], retrieved from the Internet: <https://docs.Docker.com/engine/admin/ambassador_pattern_linking/>, 2 pg.

"Exposing a Port on a Live Docker Container," [online] Stack Exchange Inc. © 2017 [retreived Dec. 22, 2017], retrieved from the Internet: <recordhttp://stackoverflow.com/questions/19897743/exposing-a-port-on-a-live-Docker-container/19905563#19905563>, 6 pg.

"How do I assign a port mapping to an existing Docker container?" [online] Stack Exchange Inc. © 2017 [retreived Dec. 22, 2017], retrieved from the Internet: <https://stackoverflow.com/questions/19335444/how-do-i-assign-a-port-mapping-to-an-existing-docker-container>, 3 pg.

"Docker Container Networking," Docker Inc. © 2017 [retreived Dec. 22, 2017], retrieved from the Internet: <https://docs.Docker.com/engine/userguide/networking/#/an-overlaynetwork-with-Docker-engine-swarm-mode>, 13 pg.

* cited by examiner

DYNAMICALLY OPENING PORTS FOR TRUSTED APPLICATION PROCESSES HOSTED IN CONTAINERS

BACKGROUND

The present invention relates to data processing systems, and more specifically, to managing ports of the data processing systems.

In the computer sciences, a port is a logical construct that identifies a specific process or a type of service. A port typically is associated with an Internet Protocol (IP) address of a host and the protocol type of the communication. Thus, the port completes the destination or origination network address of a communication session. A port typically is identified for each address and protocol by a 16-bit number, commonly known as the port number. For example, an address may be "protocol: TCP, IP address: 1.2.3.4, port number: 80." Specific port numbers often are used to identify specific services. Protocols that primarily use ports are transport layer protocols, such as the Transmission Control Protocol (TCP) and the User Datagram Protocol (UDP).

In the computer sciences, a socket is an internal endpoint for sending or receiving data at a node of a computer network. A socket is a representation of that endpoint in networking software (e.g., in a protocol stack) and is a form of a system resource. A socket binds a service to a particular port, and listens for connections to that port. A socket can be identified by the IP address and the port number. For example, a socket for port number 80 at IP address: 1.2.3.4 can be identified as "1.2.3.4:80."

SUMMARY

A method includes identifying a port listening request dynamically generated by an application process hosted in a container. The method also can include determining whether the application process hosted in the container is trusted. The method also can include, responsive to determining that the application process hosted in the container is trusted, dynamically selecting, using a processor, a first port to be used as an external port for the application process, and communicating a port assignment to a container engine, the port assignment indicating the first port is assigned to the application process. The method also can include mapping the first port to a second port assigned as an internal port for the application process. The method also can include opening the first port for the application process.

A system includes a processor programmed to initiate executable operations. The executable operations include identifying a port listening request dynamically generated by an application process hosted in a container. The executable operations also can include determining whether the application process hosted in the container is trusted. The executable operations also can include, responsive to determining that the application process hosted in the container is trusted, dynamically selecting, using a processor, a first port to be used as an external port for the application process, and communicating a port assignment to a container engine, the port assignment indicating the first port is assigned to the application process. The executable operations also can include mapping the first port to a second port assigned as an internal port for the application process. The executable operations also can include opening the first port for the application process.

A computer program includes a computer readable storage medium having program code stored thereon. The program code is executable by a processor to perform a method. The method includes identifying, by the processor, a port listening request dynamically generated by an application process hosted in a container. The method also can include determining, by the processor, whether the application process hosted in the container is trusted. The method also can include, responsive to determining that the application process hosted in the container is trusted, dynamically selecting, by the processor, a first port to be used as an external port for the application process, and communicating, by the processor, a port assignment to a container engine, the port assignment indicating the first port is assigned to the application process. The method also can include mapping, by the processor, the first port to a second port assigned as an internal port for the application process. The method also can include opening, by the processor, the first port for the application process.

DETAILED DESCRIPTION

Figure 1:
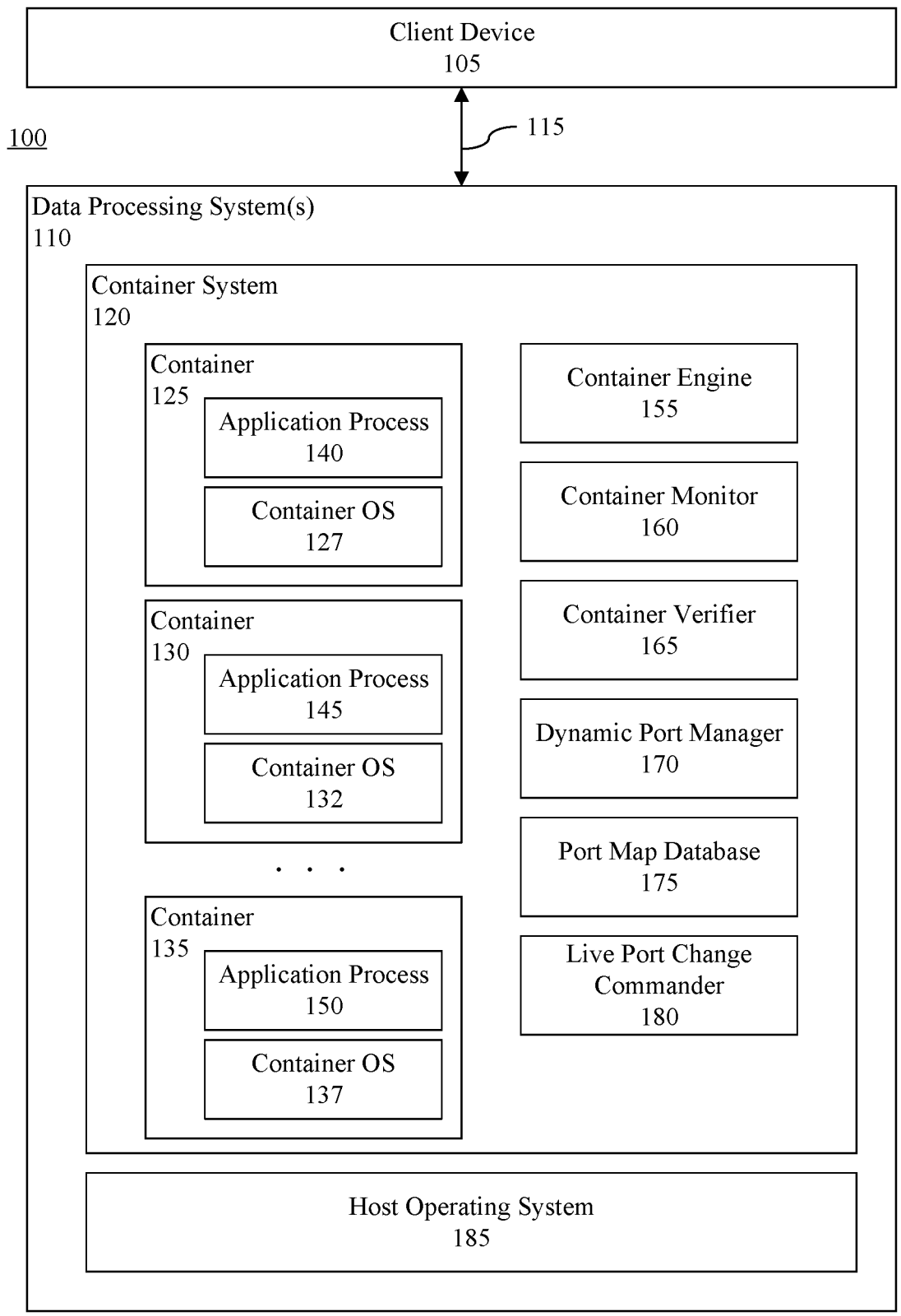
FIG. 1 is a block diagram illustrating an example of a computing environment.

This disclosure relates to data processing systems, and more specifically, to managing ports of the data processing systems. In accordance with the inventive arrangements disclosed herein, a port listening request dynamically generated by an application process hosted in a container. Whether the application process hosted in the container is trusted can be determined. Responsive to determining that the application process hosted in the container is trusted, a port for the application process can be dynamically selected, and a port assignment can be communicated to a container engine. The port assignment can indicate the selected port for the application process. The selected port can be opened for the application process. Further, in response to detecting the application process is no longer listening to the port assigned to the application process, the port can be closed, thus making the port available to other application processes.

Several definitions that apply throughout this document now will be presented.

As defined herein, the term "port" means a logical construct that completes a destination address or an origination address of a communication session.

As defined herein, the term "internal port" means a port assigned to an application process that only is visible to a container hosting the application process.

As defined herein, the term "external port" means a port assigned to an application process that is accessible to applications/application processes external to the container hosting the application process. An external port may be mapped to an internal port to allow the application process to listen to the external port by listening to the internal port assigned to the application process.

As defined herein, the term "container" means a class or data structure whose instances are collections of other objects, and which stores objects in an organized way that follows specific access rules.

As defined herein, the term "application process" means an instance of execution of an application.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "dynamically" means without user intervention.

As defined herein, the term "user" means a person (i.e., a human being).

FIG. 1 is a block diagram illustrating an example of a computing environment 100. The computing environment can include a client device 105 and one or more data processing systems 110, which can be communicatively linked via at least one communication network 115. The communication network 115 is the medium used to provide communications links between various devices and data processing systems connected together within the computing environment 100. The communication network 115 may include connections, such as wire, wireless communication links, or fiber optic cables. The communication network 115 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

The data processing system(s) 110 are a container host. The data processing system(s) 110 include a container system 120 including one or more containers 125, 130, 135 (e.g., in a container cluster). In one arrangement, each container 125, 130, 135 can host a respective container operating system 127, 132, 137, for example virtualized operating systems. In another arrangement, the container system 120 can host a container operating system (e.g., virtualized operating system) used by the containers 125, 130, 135. As noted, a container is a class or data structure whose instances are collections of other objects, and which stores objects in an organized way that follows specific access rules. In the case of containers deployed in a cloud computing environment, each container typically is designed to virtualize a particular application. For example, an instance of the container 125 can be initialized to virtualize an application process 140, an instance of the container 130 can be initialized to virtualize an application process 145, and an instance of the container 355 can be initialized to virtualize an application process 150.

The data processing system(s) 110 also can include a container engine 155, a container monitor 160, a container verifier 165, a dynamic port manager 170, a port map database 175, a live port change commander 180 and a host operating system 185. One or more of the components 155-180 can be components of the host operating system 185, for example components executing inside a container daemon. For example, the container monitor 160, the container verifier 165 and the live port change commander 180 can be components of, or otherwise execute in, the host operating system 185. The container engine 155, dynamic port manager 170 and port map database 175 can be components of, or otherwise execute in, the host operating system 185, or can execute in another operating system environment distinct from the host operating system 185. In one aspect, the dynamic port manager 170 and port map database 175 can be deployed external to the containers 125-135. Such an arrangement can allow various processes described herein to be expanded horizontally to a cluster of containers. In another aspect, a dynamic port manager 170 can be assigned to a particular container 125, for example deployed within the container 125, to enable the container 125 to perform self-port assignment authentication and allocation. The port map database 175, however, need not be contained within the container 125 in such an arrangement.

The container engine 155 can manage the containers 125-135. In another arrangement, a respective container engine 155 can be assigned to each container 125-135. In addition to functions related to port management that will be described herein, other management functions performed by the container engine 155 can include, for example, creating or resizing container clusters, creating container pods, replication controllers, jobs, services and/or load balancers, resize application controllers, update and upgrade container clusters and/or debug container clusters.

The container monitor 160 can supervise port listening behavior of the containers 125-135/application processes 140-150. In illustration, the container monitor 160 can monitor for socket.bind( ) and socket.listen( ) system calls from an application process 140, for example to another application process 145. In response to detecting such a system call, the container monitor 160 can report bind( ) and listen( ) events to the container verifier 165, for example by passing disk footage of that process to the container verifier 165. The disk footage can be, for example, an image of container files written to memory elements at runtime. The container verifier 165 can maintain criteria indicating which binaries are permitted for port listening. A binary is a major process, for example an executable file, that is configured to listen to a port. The container verifier 165 can authenticate port change requests to ensure that only authorized port change requests are processed. For instance, the container verifier 165 can determine whether an application process 140-150 is allowed (e.g., authorized) to have a port opened.

The dynamic port manager 170 can act as a container management service that accepts authenticated port listening requests and, in response, dynamically selects legal ports and assigns the ports to application processes 140-150. The dynamic port manager 170 can save data mapping the port assignments in a manner that makes the data accessible to outside processes. For example, the dynamic port manager 170 can store the port mapping data to the port map database 175. The dynamic port manager 170 also can recycle host ports for valid release port requests to make the ports available for other application processes or other application process instances. For example, the dynamic port manager 170 can remove the port mapping data for that port from the port map database 175. Further, the dynamic port manager 170 monitor port usage, and if a port is no longer being used, for example the application process 140-150 to which the port is assigned is closed, crashed or otherwise is inactive, the dynamic port manager 170 can automatically recycle the port and remove the port mapping data for that port from the port map database 175.

The live port change commander 180 can assemble network manipulation commands in response to an add port request being received and authenticated by the container verifier 165. The specific network manipulation commands assembled by the live port change commander 180 can depend on which port binding mechanism is used by the container engine 155.

Figure 2:
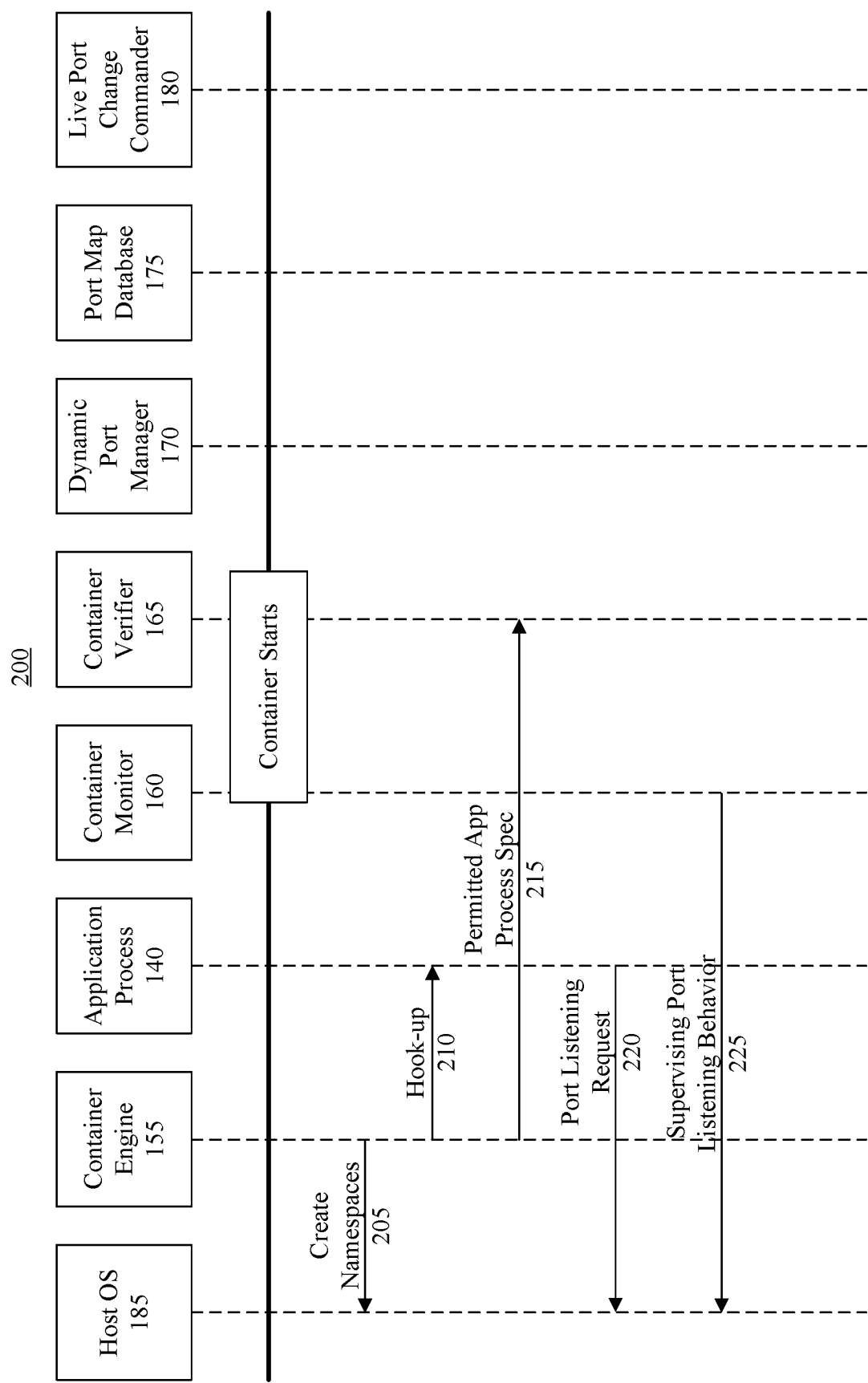
FIG. 2 is a signal flow diagram illustrating example signal flows in a container system initiated in response to initiation of an instance of a container.

FIG. 2 is a signal flow diagram 200 illustrating example signal flows in the container system 120 initiated in response to initiation of an instance of a container 125-135. In this example, an instance of the container 125 is initiated for an application process 140. At step 205, the container engine 155 can create namespaces in response to the instance of the container starting, and communicate the namespaces to the host operating system 185. A namespace is a separation mechanism for a resource (e.g., processor(s), memory, etc.) on the container's host data processing system 110 that is associated with the container 125. A namespace typically is not visible to other data processing systems. Each namespace can include an identifier unique to the container 125 allocated by the host data processing system 110. The identifier need not be human readable. The unique identifier need not include a host name, but can if the identifier is still unique when including the host name. Creation and use of namespaces is known in the art.

At step 210, the container engine 155 can hook-up the application process 140. The term "hook-up," as used herein, means that when a container 125 is started, the container 125 is presented to be a process on the container host data processing system 110, or is presented to be a set of processes with a root process being a parent of all other processes of the container 125. The container 125 can be allocated with a plurality of process identifiers, for example an identifier on both to the host data processing system 110 and an identifier for the container 125, and a mapping can be performed to associate those identifiers with one another. The hook-up also can associate the aforementioned allocated resources to the newly started container 125 in the namespace(s). Such hook-up processes are known in the art.

At step 215, the container engine 155 can specify to the container verifier 165 that the application process 140 is permitted. Further, an MD5 hash algorithm can be used to provide a digital signature to executable files that are used to run the application process 140. In illustration, whenever a port request is detected, the container verifier 165 can check the MD5 value of current executable files for the application process issuing a port listening request (issued at step 220) and compare that value with a value assigned when the container image is made to determine whether the executable files have been changed unexpectedly or with malice. If so, the verification will fail, the port listening request will not be processed, and the behavior can be logged by the container verifier 165, for example to a suitable data structure.

At step 220, the application process 140 can dynamically generate a port listening request (e.g., open_listenfd) and communicate the port listening request to the host operating system 185, for example in response to step 210. In response to the port listening request, the container operating system 127 for the container 125 hosting the application process 140 can open an internal port for the application process 140 that only is visible to the container 125. At step 225, the container monitor 160 can communicate data to the host operation system 185 indicating that the container monitor 160 is supervising the port listening behavior. The container monitor 160 can determine to initiate such communication based on detecting the port listening request while monitoring the container in which the application process 140 is executing.

Figure 3:
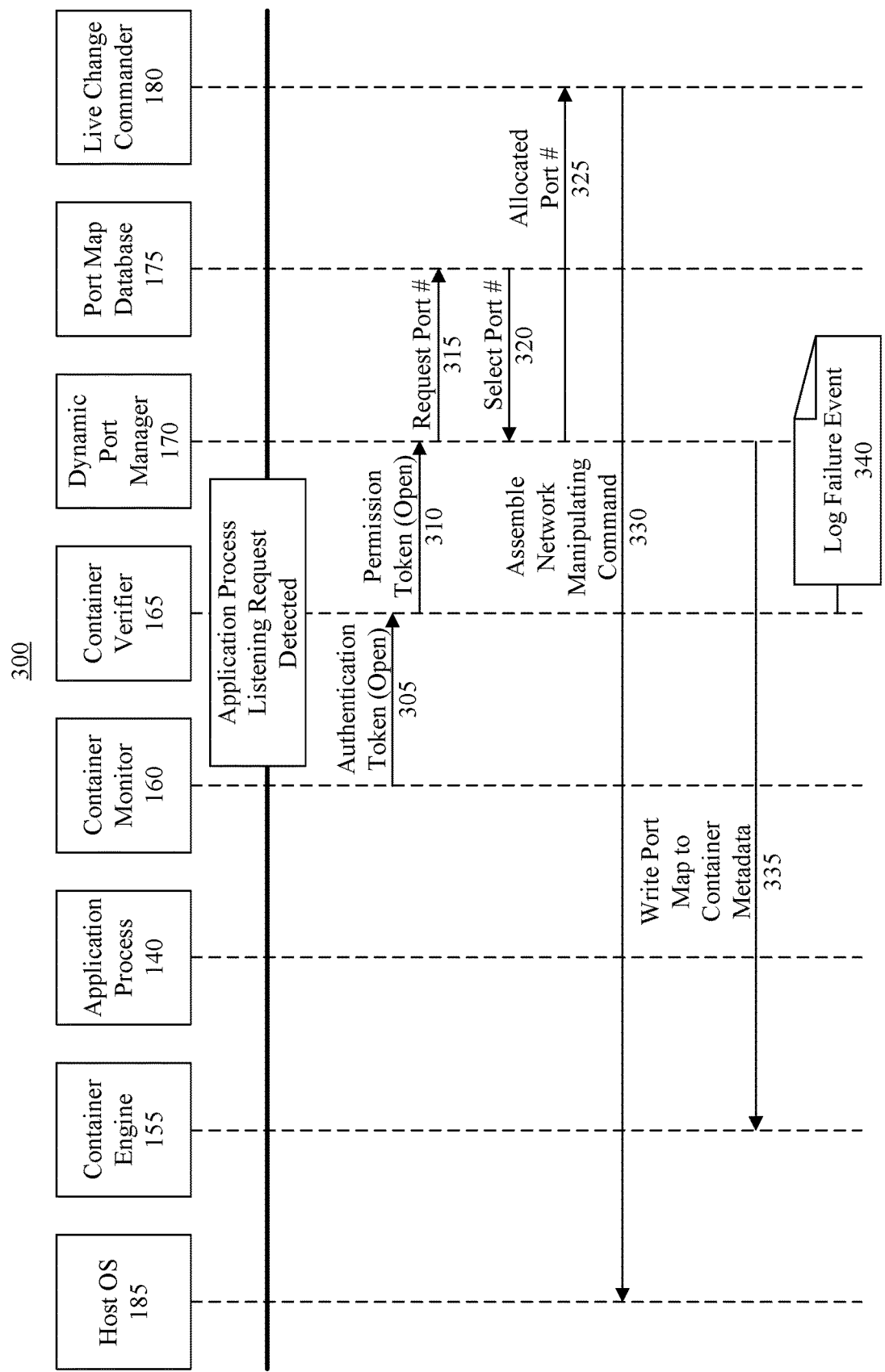
FIG. 3 is a signal flow diagram illustrating additional example signal flows in a container system in initiated in response to detecting an application process listening request being detected.

FIG. 3 is a signal flow diagram 300 illustrating additional example signal flows in the container system 120 in initiated in response to detecting the application process 140 listening request being detected. At step 305, responsive to the application process port listening request being detected, the container monitor 160 can communicate to the container verifier 165 an authentication token indicating a request to open an external port for the application process 140. In response, the container verifier 165 can authenticate the token to authenticate the port opening request (e.g., ensure the port opening request is valid), and that the application process 140 is a trusted application and authorized to have an external port opened for the application process 140, for example by comparing data in the token to authentication criteria. The authentication criteria can be maintained in a suitable data structure accessible by the container verifier 165, for example a data table.

Responsive to the container verifier 165 authenticating the token, at step 310 the container verifier 165 can communicate a permission token to the dynamic port manager 170. The permission token can represent permission to open an external port for the application process 140. In response, at step 315 the dynamic port manager 170 can request a port number from the port map database 175. At step 320, the port map database 175 (or the dynamic port manager 170) can select a presently unallocated port number from the port map database 175 from a pool of available ports in the data processing system(s) 110 (i.e., container host), and create a mapping, in the port map database 175, of the selected port (external port) to the internal port assigned to the application process 140.

Responsive to selecting the port number, at step 325 the dynamic port manager 170 can communicate to the live port change commander 180 an indicator indicating the selected port number is a port number being allocated as an external port for the application process 140. In response, at step 330 the live port change commander 180 can assemble a network manipulation command and communicate the network manipulation command to the host operating system 185. In response, the host operating system 185 can open the port assigned to the application process 140 as the external port. The network manipulation command can separate network topology (e.g., proxy or iptables) depending on which port binding mechanism is used by the container engine 155. At step 335, the dynamic port manager 170 can write to container metadata maintained by the container engine 155 for container 125 port map data indicating that the application process 140 is assigned the selected port number, thereby assigning the selected port number to the application process 140 as the external port. In this regard, writing the port map data to the container metadata, the live port change commander can create a new container-aware port channel for use by applications (e.g., application processes) external to the container 125 to access the application process 140. Based on the port map data, when the application process 140 listens to the internal port assigned to the application process 140, the application process 140 will be listening to the external port. In illustration, the container engine 125 can use the port map data to create a link between the internal port and the external port. The client device 105 can request a connection to the application process 140 by opening a connection to the data processing system(s) 110 at the external port assigned to the application process 140 (e.g., at hostname:port).

Referring again to step 305, if authentication of the application process 140 failed, at step 340, the container verifier 165 can log a failure event. Further, the container verifier 165 can trigger an alert. The container verifier 165 can communicate the alert to one or more of the components of the data processing system(s) 110, for example to the host operating system 185 and/or to the dynamic port manager 170. The process then can end and need not proceed to step 310.

Figure 4:
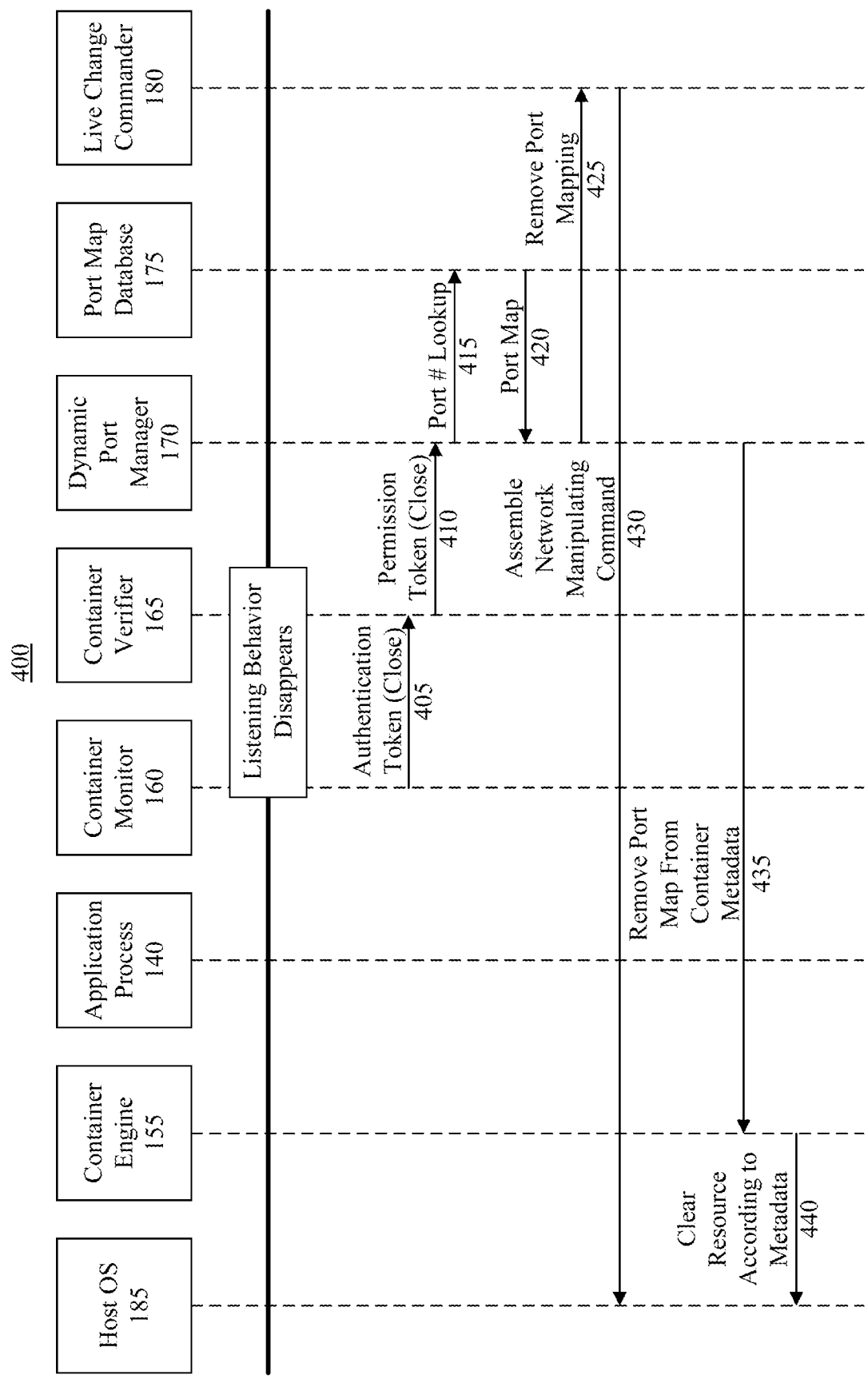
FIG. 4 is a signal flow diagram illustrating additional example signal flows in a container system in initiated in response to detecting an application process is no longer listening to a port.

FIG. 4 is a signal flow diagram 400 illustrating additional example signal flows in the container system 120 in initiated in response to detecting the application process 140 is no longer listening to the external port assigned to the application process 140, for example due to the application process 140 closing, crashing or otherwise becoming inactive. In illustration, the container monitor 160 can monitor the application process 140 to determine whether the application process 140 is no longer listening to the external port. In response to determining that the application process 140 is no longer listening to the external port, at step 405 the container monitor 160 can communicate the container verifier 165 an authentication token indicating a request to close the port assigned to the application process 140 as the external port. In response, the container verifier 165 can authenticate the token to ensure that the token is valid and that the external port assigned to the application process 140 may be closed, for example by comparing data in the token to authentication criteria.

Responsive to the container verifier 165 authenticating the token, at step 410 the container verifier 165 can communicate a permission token to the dynamic port manager 170. In response, at step 415 the dynamic port manager 170 can access the port map database 175 to determine the port number assigned to the external port assigned to the application process 140. At step 420, the dynamic port manager 170 can retrieve a port map from the port map database 175 and determine the port number assigned to external port from the port map. The dynamic port manager also can remove that port map from the port map database 175.

In response to determining the port number assigned to the application process 140, at step 425 the dynamic port manager 170 can communicate to the live port change commander 180 an indicator indicating that the mapping of the external port to the internal port assigned to the application process 140 is being removed. In response, at step 430 the live port change commander 180 can assemble a network manipulation command and communicate the network manipulation command to the host operating system 185. The network manipulation command can indicate to the host operating system to close the port mapping between the external port and internal port assigned the application process 140. In response, the host operating system 185 can close the external port. Further, at step 435, the dynamic port manager 170 can remove from the container metadata port map data mapping the external port to the internal port assigned to the application process 140. In response, at step 440 the container engine 155 can clear resources of the host operating system pertinent to the assignment of the external port to the application process 140 according the changes in the metadata, thereby making the port available to other application processes.

At this point it should be noted that the various steps performed in the signal flow diagrams 200, 300, 400 of FIGS. 2, 3 and 4 can be performed in real time. Accordingly, port allocation, opening and closing can be performed in real time according to the requirements of the application processes 140-150 hosted in the containers 125-135.

Figure 5:
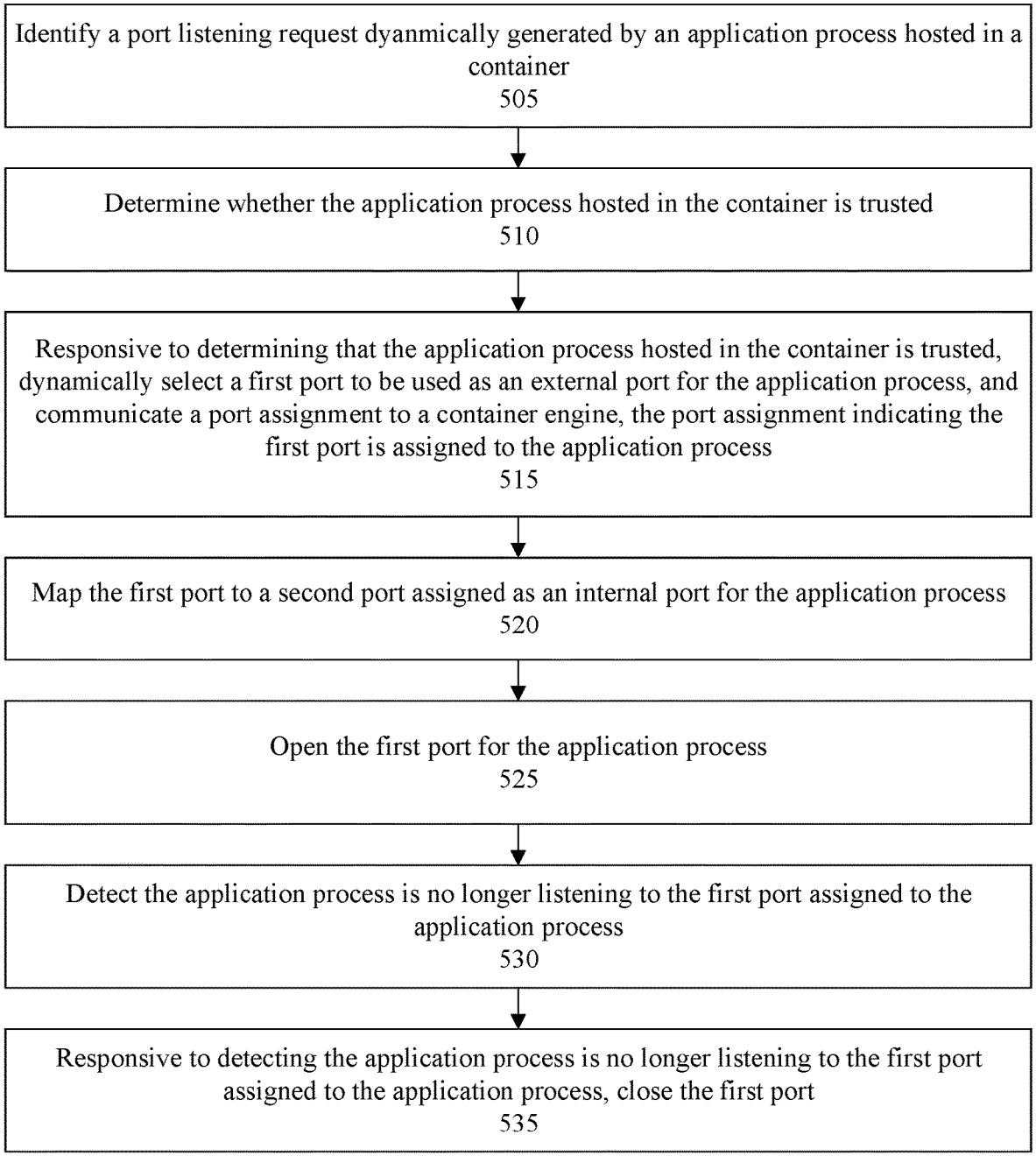
FIG. 5 is a flow chart illustrating an example of a method of opening a selected port for a trusted application process hosted in a container.

FIG. 5 is a flow chart illustrating an example of a method 500 of opening a selected port for a trusted application process hosted in a container. At step 505, the container monitor 160 can identify a port listening request dynamically generated by an application process 140 hosted in a container 125. At step 510, the container verifier 165 can determine whether the application process 140 hosted in the container 125 is trusted. The container verifier 165 also can authenticate the port listening request. At step 515, responsive to the container verifier 165 determining that the application process hosted in the container is trusted and, optionally, authenticating the port listening request, the dynamic port manager 170 can dynamically select a first port to be used as an external port for the application process and communicate a port assignment to the container engine 155, thus creating a new container-aware port for the application process 140. For example, the dynamic port manager 170 can write to container metadata maintained by the container engine 155 for container 125 port map data indicating that the application process 140 is assigned the selected port number. In this regard, the port assignment can indicate the first port is assigned to the application process. At step 520, the dynamic port manager 170 can map the first port to a second port assigned as an internal port for the application process. For example, the dynamic port manager 170 can map the first port to the second port in the port map database 175. At step 525, the host operating system 185 can open the first port for the application process 140. At step 530, the container monitor 160 can detect the application process 140 is no longer listening to the first port assigned to the application process 140. At step 535, responsive to the container monitor 160 detecting the application process is no longer listening to the first port assigned to the application process, the host operating system 185 can close the first port.

Figure 6:
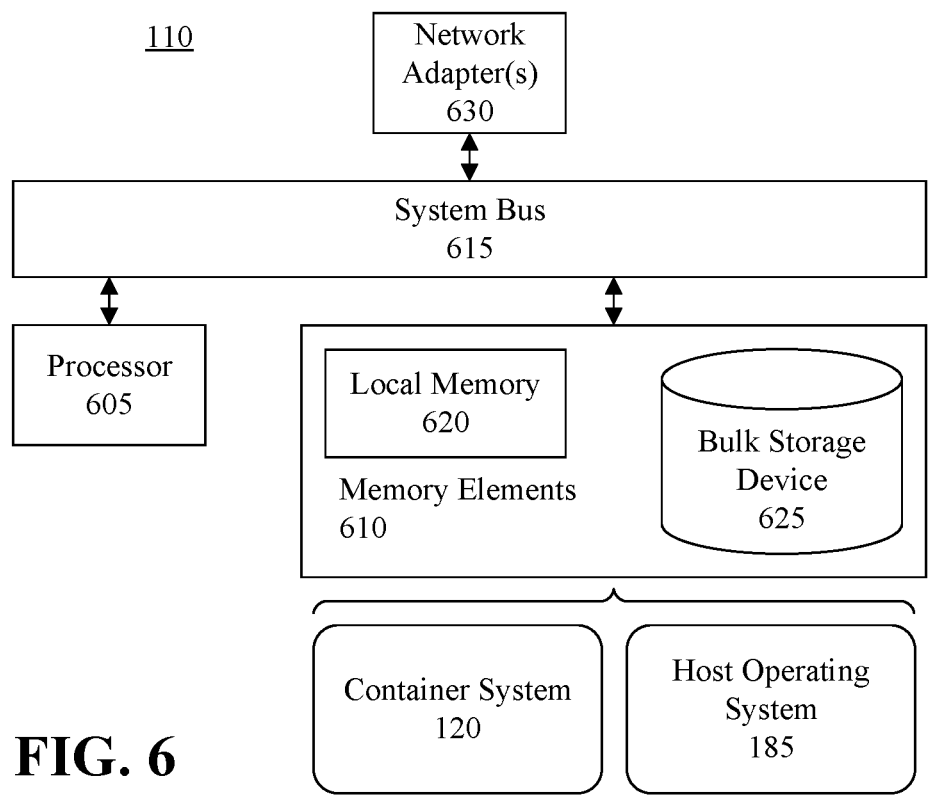
FIG. 6 is a block diagram illustrating an example architecture for a data processing system.

FIG. 6 is a block diagram illustrating an example architecture for the data processing system(s) 110 of FIG. 1. The data processing system(s) 110 can include at least one processor 605 (e.g., a central processing unit) coupled to memory elements 610 through a system bus 615 or other suitable circuitry. As such, the data processing system(s) 110 can store program code within the memory elements 610. The processor 605 can execute the program code accessed from the memory elements 610 via the system bus 615. It should be appreciated that the data processing system(s) 110 can be implemented in the form of any system including a processor and memory that is capable of performing the functions and/or operations described within this specification. For example, the data processing system(s) 110 can be implemented as a server, a plurality of communicatively linked servers, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system(s) 110 also can include one or more cache memories (not shown) that provide temporary storage of at least some program code in order to reduce the number of times program code must be retrieved from the bulk storage device 625 during execution.

One or more network adapters 630 also can be coupled to data processing system(s) 110 to enable the data processing system(s) 110 to become coupled to other systems, computer systems, client devices, remote printers, and/or remote storage devices through intervening private or public networks. Modems, cable modems, transceivers, and Ethernet cards are examples of different types of network adapters 630 that can be used with the data processing system(s) 110.

As pictured in FIG. 6, the memory elements 610 can store the components of the data processing system(s) 110 of FIG. 1, namely the container system 120 and the host operating system 185. Being implemented in the form of executable program code, these components of the data processing system(s) 110 can be executed by the data processing system(s) 110 and, as such, can be considered part of the data processing system(s) 110. Moreover, the container system 120 and the host operating system 185 are and/or include functional data structures that impart functionality when employed as part of the data processing system(s) 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
identifying a port listening request dynamically generated by an application process hosted in a container;
responsive to identifying the port listening request dynamically generated by the application process hosted in the container, determining whether the application process hosted in the container is trusted;

responsive to determining that the application process hosted in the container is trusted, dynamically selecting, using a processor, a first port to be used as an external port for the application process, and communicating a port assignment to a container engine, the port assignment indicating the first port is assigned to the application process;

mapping the first port to a second port assigned as an internal port for the application process; and opening the first port for the application process.

2. The method of claim 1, wherein mapping the first port to the second port enables the application process to listen to the first port by listening to the second port.

3. The method of claim 1, further comprising:

authenticating the port listening request, wherein communicating the port assignment to the container engine for the container further is responsive to authenticating the port listening request.

4. The method of claim 3, wherein a dynamic port manager deployed external to the container receives a permission token representing the authenticated port listening request and performs the dynamically selecting the first port for the application process.

5. The method of claim 3, wherein a dynamic port manager deployed within the container receives a permission token representing the authenticated port listening request and performs the dynamically selecting the first port for the application process.

6. The method of claim 1, wherein communicating the port assignment to the container engine creates a new container-aware port channel for an application, external to the container hosting the application process, to access the application process.

7. The method of claim 1, further comprising:

detecting the application process is no longer listening to the first port assigned to the application process; and responsive to detecting the application process is no longer listening to the first port assigned to the application process, closing the first port.

* * * * *